United States Patent
Harris

(10) Patent No.: US 6,738,643 B1
(45) Date of Patent: May 18, 2004

(54) PHONE SYNC

(76) Inventor: Scott C. Harris, P.O. Box 927649, San Diego, CA (US) 92192

( * ) Notice: Subject to any disclaimer, the term of this patent is extended or adjusted under 35 U.S.C. 154(b) by 332 days.

(21) Appl. No.: 09/703,332

(22) Filed: Oct. 31, 2000

(51) Int. Cl.[7] .............................. H04M 1/00
(52) U.S. Cl. ............... 455/556.1; 455/557; 455/550; 455/575.1; 455/569; 379/110.01; 379/90.01; 379/93.01; 379/93.09; 379/93.23
(58) Field of Search ................... 455/556, 557, 455/550, 575, 418, 569; 713/323; 379/142, 88.03, 110.01, 90.01, 93.01, 93.09, 93.23; 705/80

(56) References Cited

U.S. PATENT DOCUMENTS

| | | | |
|---|---|---|---|
| 5,907,604 A | * | 5/1999 | Hsu .................... 379/142.06 |
| 5,926,756 A | * | 7/1999 | Piosenka et al. ............ 455/418 |
| 6,236,868 B1 | * | 5/2001 | Lygas ........................ 455/569 |
| 6,266,539 B1 | * | 7/2001 | Pardo ........................ 455/556 |
| 6,374,099 B1 | * | 4/2002 | Bi et al. ................... 455/404.1 |
| 6,427,078 B1 | * | 7/2002 | Wilska et al. ............... 455/550 |
| 6,434,537 B1 | * | 8/2002 | Grimes ........................ 705/40 |
| 6,510,524 B1 | * | 1/2003 | Osborn et al. ............. 713/323 |
| 6,546,083 B1 | * | 4/2003 | Chaves et al. ........... 379/88.03 |

FOREIGN PATENT DOCUMENTS

EP            0773685 A1   *   5/1997

\* cited by examiner

*Primary Examiner*—Sinh Tran
*Assistant Examiner*—David Nguyen

(57) ABSTRACT

A PDA and telephone are associated so that the PDA can automatically dial the telephone. Another aspect enables acquiring a digital photo, and associating that with contact information on the PDA.

9 Claims, 2 Drawing Sheets

PHONE SYNC

BACKGROUND

The present application relates to the interaction between a computer such as a personal digital assistant (PDA) and a communication device, such as a telephone.

The modern trend in the art has been to incorporate more and more intelligence into telephones. For example, cellular phones have been built with a palm operating system therein. Most modern phones include organizers, to do lists, and alarms.

However, it is common for a user to buy a new phone every few years. Moreover, although the phones may include some of the functions desired by the user, the user often buys the phone for the phone functions or looks, rather than for the organizer functions. Many users have both a phone and an organizer.

SUMMARY

The present application describes ways of interacting between a personal digital assistant or some other type of computer, and an electronic device such as a telephone.

BRIEF DESCRIPTION OF THE DRAWINGS

These and other aspects will now be described in detail with reference to the accompanying drawings, wherein.

DETAILED DESCRIPTION

Figure 1:
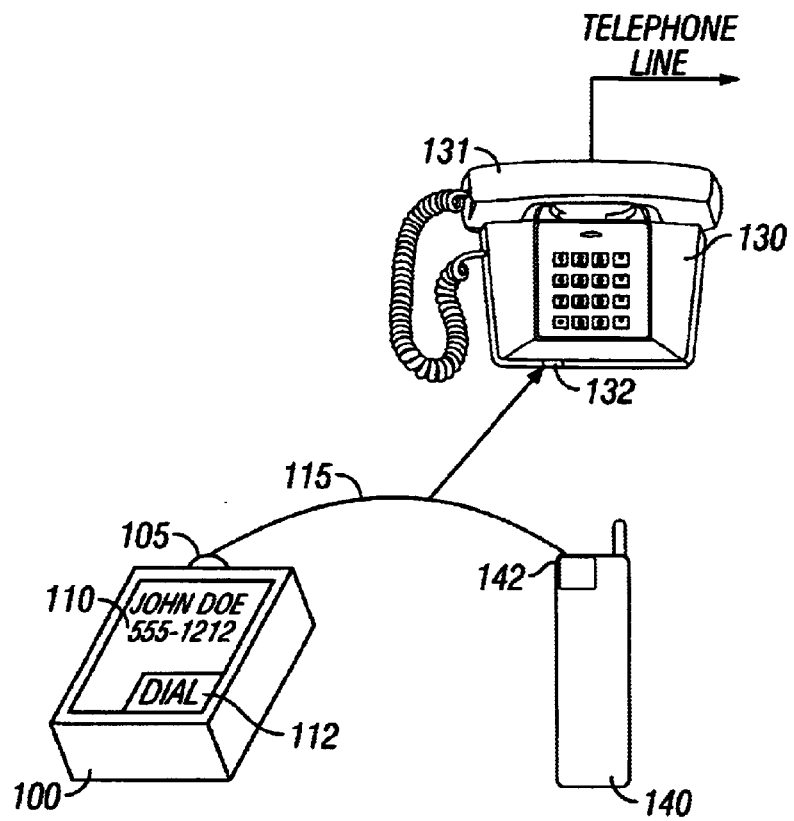
FIG. 1 shows a basic interaction between a personal digital assistant, and telephones using infrared.

Personal digital assistant 100 is shown in FIG. 1 and as conventional includes an infrared port 105 thereon. The infrared port is capable of producing information output. For example, in the Palm™ and Visor™ series of personal digital assistants, the infrared port can be used for exchanging information, such as programs, between different units.

The PDA stores a plurality of contact information for each of a plurality of contacts. The display screen 110 shows the person's name and phone number as conventional in these digital units. The device also includes an icon or spot on the screen 112, which commands dialing the displayed number. When the icon is selected in this way, information indicative of the displayed number is sent over the infrared link 115.

The infrared link is directed to all devices in range. As shown in FIG. 1, there are two separate devices in range, a conventional desktop telephone 130, and a portable telephone 140 which can be a cordless telephone or cell phone. Each includes a respective infrared link 132, 142. The infrared information 115 is directed to all devices in range, and commands all of these devices to dial.

A number of different ways of operation can be used. For example, if either of the devices 130 or 140 receives the infrared signal, it can automatically go into speakerphone mode and begin dialing. Another option is that the receiving device will only dial the next time that the on hook or send button is used. Therefore, the user can press the dial button 112, causing the information to be sent to the infrared port 132 and stored in the phone 130. Once stored in the phone 130, the phone will automatically dial the information the next time the handset 131 is removed from its cradle. Similarly, the information can be sent to the cell phone 140, and stored in the cell phone. The information is then sent the next time that the send button on the cell phone is actuated.

If multiple phones are in range, a response system can be used, where the first phone responds to indicate that it will make the next call.

Figure 2:
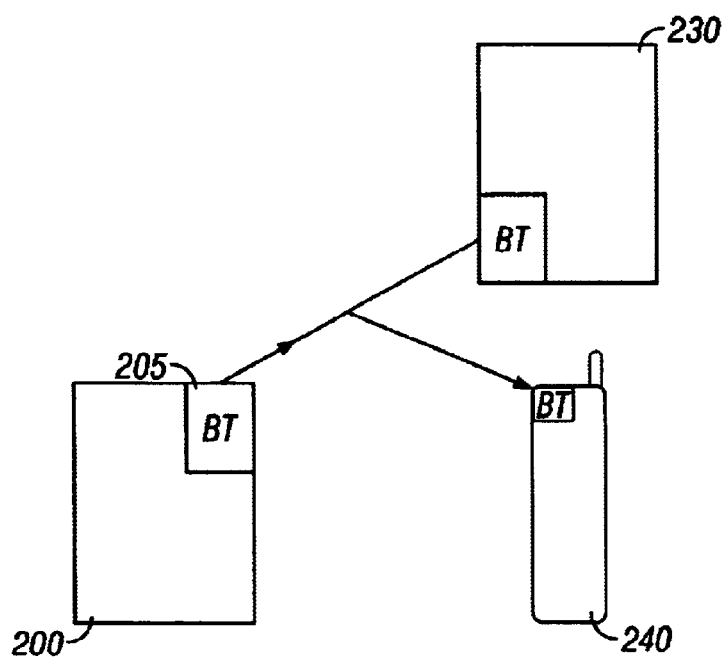
FIG. 2 shows a similar interaction using a wireless protocol such as bluetooth.

FIG. 2 shows an alternative operation in which the personal digital assistant 200 includes bluetooth module 205. While FIG. 2 shows the module being bluetooth, it should be understood that any short-range communication protocol could be used in place of the bluetooth. Bluetooth may be specifically preferred since it is a short range, low-power, high noise immune protocol. Bluetooth specifically operates by providing spread spectrum information over the available frequency range. Other similar systems can be used.

Again, the bluetooth information can be received by phone 230 which is a desk phone, or phone 240 which is a cordless type phone.

Figure 3:
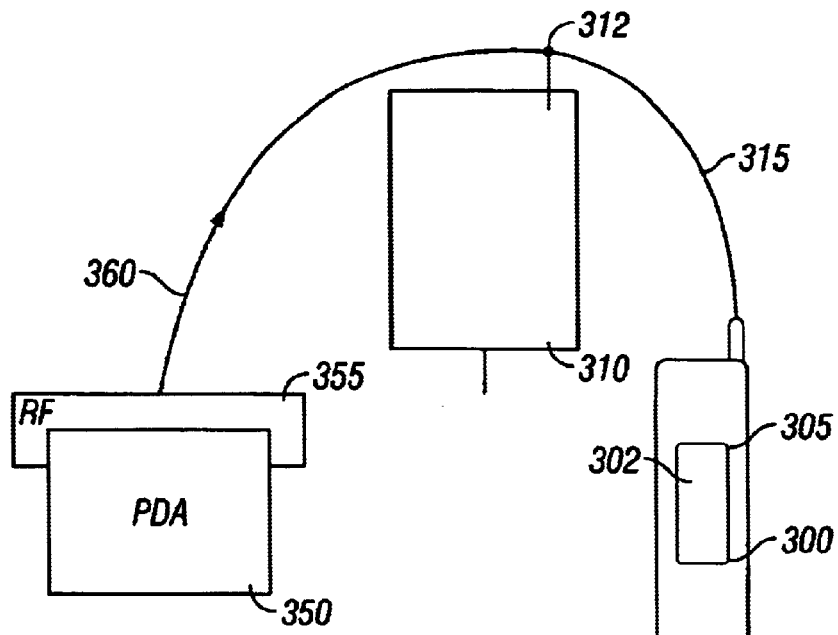
FIG. 3 shows a personal digital assistant taking on an RF character which allows it to emulate a cordless phone.

Another embodiment is shown in FIG. 3. In this embodiment, the phone 300 is a conventional cordless phone. The handset 305 communicates with the base portion 310 via RF communications 315. Different so-called part 15 frequencies can be used for the RF communication 315. For example, currently used frequencies include 48 MHz, 900 MHz, and 2.4 GHz. The antenna 312 on the base portion 310 receives this information, and allows communication with the handset 305. The handset 305 can include a user interface 302 which can include controls for all of the different kinds of functions of the phone. This can allow the phone to dial, to pick up, hang up and all other functions of the phone.

In this embodiment, the PDA 300 either includes RF capabilities, or has a snap on part 355 which receives communication from the PDA and converts it into the part 15 frequency. For example, the PDA may have an infrared port. However, the RF converter 355 receives the infrared information, and converts it to the specified part 15 frequency used by the phone 300. In this way, the output 360 is in the same language spoken by the handset 305.

When the PDA commands to "dial" and output 360 is produced which simulates the output that would be produced by the phone handset 305 dialing the same information. This is received by the antenna 312, and causes the phone 310 to dial. Again, the dialing may be in speakerphone mode, or may be delayed until the next off hook is detected.

Figure 4:
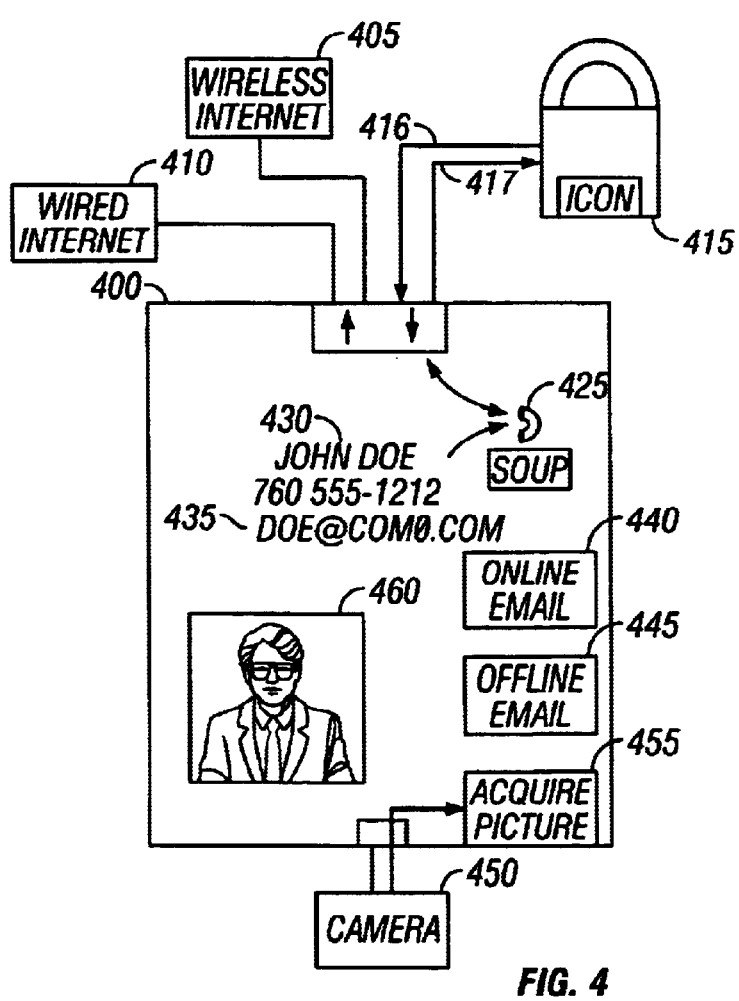
FIG. 4 shows a user interface of a personal digital assistant.

FIG. 4 shows a user interface of the improved PDA system. In this embodiment, the PDA has the ability to detect the kinds of accessory devices which are connected thereto. For example, PDA 400 can communicate via its infrared port with a wireless Internet device 405. A wired Internet device 410 may also be connected. The PDA can also communicate with telephone 415. In this embodiment, the wireless communication is two way. For example, when the PDA sends an infrared signal 415 to the phone 415, the phone 415 detects the signal 416, and responds with a return signal 417. The PDA receives the signal 417, and from it detects that a phone is within range and available for communication. By detecting that the phone is within range and available for communication, an icon 425 is displayed. This icon may be a picture of the phone, or a description of the phone. The icon may be downloaded over the link 417, or may be prestored in the PDA. In this embodiment, the phone 415 is shown as the brand CANY. The icon shown on the PDA therefore also has the brand CANY.

As conventional, the PDA also includes the persons name 430 and other information. The other information can include an e-mail address 435. Associated with the e-mail address 435 are the different ways that e-mail can be sent. For example, if wireless Internet is detected, then an online e-mail icon 440 may be displayed. An off-line e-mail icon may always be displayed. The off-line icon allows e-mail to be sent by storing it in the PDA until the next synchronization such as a hot sync. In this embodiment, a camera 450 is also shown attached. When the camera is shown attached, then an acquire picture icon 455 becomes available. The acquire picture icon can be selected to take a picture with the camera that is associated with the person's profile. The picture 460 is shown on the PDA as it comes up associated with the person's profile. Therefore, as part of this system, then the camera can acquire a picture. The picture is preferably a grey scale, low resolution picture e.g. <5 KB in size.

In operation, one way of using the system may be when a user may have a portable phone with them in the automobile. In order to dial a number, the user accesses the contact information on their PDA which is separate from the telephone. As part of that contact information, different icons are displayed which indicate which options are available at the present time. For example, in the car, with the phone present, the cell phone icon may be displayed. Other options may also be displayed at that time. If the automobile is equipped with an auto mounted PC, one option might be a voice recognition option, so that the user could send a voice-initiated e-mail. Otherwise, the user can send an off-line e-mail, or a mobile e-mail if the automobile is so equipped.

When the icon is selected, then one of the communication techniques disclosed above is used to automatically cause the cell phone to dial the specified contact number.

Although only a few embodiments have been disclosed in detail above, other modifications are possible.

What is claimed is:

1. A method, comprising:
    storing contact information items including contact telephone numbers on a first computer which has the capability of communicating to each of a number of telephones which are physically separate from the first computer;
    determining devices which of multiple telephones are currently being communicated with;
    displaying an indication on the first computer indicating which of the telephones are currently being communicated with; and
    enabling selecting said indication, to dial a telephone number on a telephone corresponding to a selected indication responsive to said selecting, said telephone numbers being from said contact information numbers.

2. A method as in claim 1, further comprising enabling said indication to be selected to dial said telephone number on said telephone.

3. A method as in claim 1, wherein at least one of said accessory devices is a camera, and further comprising enabling said camera to take a picture that will be associated with a currently displayed contact information.

4. A method as in claim 1, wherein said communicating by said first computer is a wireless communicating, and said wireless communicating provides said telephone number to a telephone corresponding to a selected indication.

5. A method, comprising:
    storing contact information items on a first computer which has the capability of communicating to each of a number of accessory devices which are physically separate from the first computer, wherein at least one of said accessory devices is a device that enables an e-mail operation, and at least one of said contact information items is an e-mail address;
    determining accessory devices which are currently being communicated with; and
    displaying an indication of e-mail on the first computer indicating those accessory devices which are currently being communicated with; and
    enabling selecting said indication to send an email on an accessory device corresponding to a selected indication, on an email address from among said contact information.

6. A method as in claim 5, further comprising a first indication of off-line e-mail and a second indication of online e-mail.

7. An apparatus, comprising:
    a first computer, storing contact information about a plurality of different contacts and a user interface that allows requesting contact information about a specified contact;
    a digital camera, associated with said first computer, and operating to obtain a digital picture and to associate said digital picture with a specified contact in said plurality of contacts;
    said first computer including an operation whereby, after said digital picture is associated with said contact, when a particular contact is accessed via said user interface, said picture is provided associated with said contact; and
    further comprising wireless capability associated with said first computer, and at least one telephone having a capability to receive a communication from said wireless capability wherein said first computer has a command that causes said telephone to dial a phone number associated with a specified contact, via said wireless capability.

8. An apparatus as in claim 7, wherein said telephone is a cordless phone, and said wireless capability is a capability that communicates using a same format and frequency as said cordless phone.

9. An apparatus as in claim 7, further comprising detecting said telephone using said wireless capability, in said first computer, and displaying an indication of said telephone being in range of said first computer, only when said telephone is detected.

* * * * *